No. 895,347. PATENTED AUG. 4, 1908.
A. M. DESPREZ.
COLANDER.
APPLICATION FILED MAR. 11, 1907.
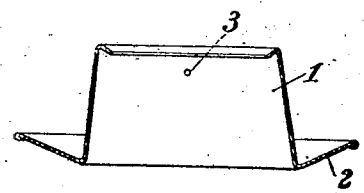
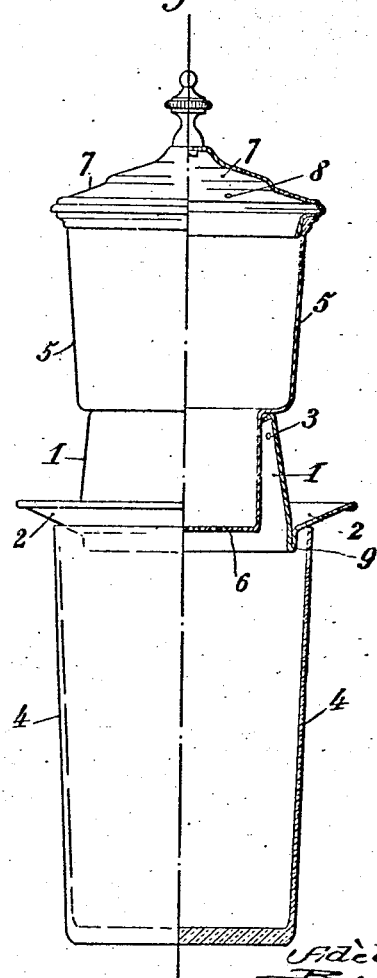
Witnesses:
Inventor
Adèle Mathilde Desprez
By
James L. Norris
Atty.

UNITED STATES PATENT OFFICE.

ADÈLE MATHILDE DESPREZ, OF ASNIÈRES, FRANCE.

COLANDER.

No. 895,347.     Specification of Letters Patent.     Patented Aug. 4, 1908.

Application filed March 11, 1907. Serial No. 361,795.

*To all whom it may concern:*

Be it known that I, ADÈLE MATHILDE DESPREZ, a citizen of the Republic of France, and residing at Asnières, Province of Seine, France, have invented certain new and useful Improvements in Colanders and the Like, of which the following is a specification.

This invention relates to colanders and the like and has for its object a supporting device for colanders and the like which can be placed on recipients of various necks and which may be used preferably in combination with coffee filters. The colanders or the like being always manufactured for a predetermined size of recipients, project down into the recipient and thus prevent the said recipients from being filled completely.

One feature of this invention consists in providing such a support for the colanders and the like that it does not project itself down into the recipient to any appreciable extent and moreover prevents the colanders and the like from projecting down into the recipient.

Another feature of this invention consists in providing a flange at the bottom of the said support for allowing the latter to be placed on recipients of various necks.

Another feature of this invention consists in providing in the support a hole or holes for allowing the air to escape from the recipient, thus facilitating the flowing down of the liquid or the like.

In the accompanying drawing, Figure 1 shows a vertical section through the new support, Fig. 2 shows a modified shape of this support in combination with a coffee filter placed on a glass, the left half of this figure being an elevation, and the right part of the same a vertical section.

The support is constituted by a body 1 of the shapes shown on the drawing or of any other convenient shape, cylindrical or widening at the top for instance. This body is provided with a flange 2 formed preferably in one piece with the body. This flange may be a conical one as shown on Fig. 1 as this shape appears to be the best one, but it may be also of any other convenient shape; it may be flat, conical with its widening at the bottom, convex, etc.; it may also project inside of the body instead of projecting outside as shown on the drawing. The breadth of the said flange must be always sufficient for being placed on recipients of various sizes, even of various shapes of necks. A portion of the flange 2 is bent back upon the body portion, as shown at 9 in Fig. 2 of the drawing, to form a drip. It is obvious from such a construction that the vapor will not collect about the under side of the flange and body portion and find its way to the exterior of the receptacle 4. The support is further provided with a hole or holes as shown at 3 which facilitate the flowing down of the liquid or the like.

The support may be used in combination with a coffee filter as shown in Fig. 2. It can be thus substituted to the known combinations of coffee filters and glass. In the said latter combinations the coffee filter can be used only on a glass of peculiar size, while the new combination may be used on any recipient whatever, and the flowing of the coffee is always regular.

The combined support and coffee filter comprises the support as shown on Fig. 2 or a similar one and further a vessel 5 the bottom 6 of which is perforated; this vessel is provided with a lid 7 in which a hole or holes 8 are also bored.

To the advantages hereinbefore mentioned a further one must be added which is more peculiarly inherent to the example shown on the drawings. The support and the filter may be manufactured by a simple stamping or pressing, and thus the manufacture of these pieces is very easy and cheap. Furthermore, the diameter of the bottom part of the filter being smaller than the diameter of its top part, the filter holds firmly on its support.

Having thus described and ascertained the nature of my invention and in what manner the same may be used I declare that what I claim is

1. An article of manufacture comprising a hollow cylindrical upwardly converging body forming open extremities, one of increased diameter with respect to the other, the wall of the larger extremity being bent on itself outwardly and upwardly at an inclination to produce an annular imperforate drip trough exterior of the body, and the wall of the smaller extremity of the body being bent inwardly to form an annular supporting flange.

2. An article of manufacture comprising a hollow body having rigid therewith at one extremity an outwardly bent inclined flange forming an annular imperforate drip trough exterior of said body and at the other extremity an inwardly extending annular supporting flange.

In witness whereof I have hereunto set my hand in the presence of two witnesses.

ADÈLE MATHILDE DESPREZ.

Witnesses:
HERNANDO DE SOTO,
CHARLES WEISMAN.